US006185504B1

(12) United States Patent
Berstis et al.

(10) Patent No.: US 6,185,504 B1
(45) Date of Patent: Feb. 6, 2001

(54) VEHICLE SCHEDULING AND COLLISION AVOIDANCE SYSTEM USING TIME MULTIPLEXED GLOBAL POSITIONING SYSTEM

(75) Inventors: Viktors Berstis, Austin; Joel Leslie Smith, Round Rock, both of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/239,249

(22) Filed: Jan. 28, 1999

(51) Int. Cl.[7] .................................................. G06F 165/00

(52) U.S. Cl. .......................... 701/213; 701/207; 701/214; 340/425.5; 340/436; 342/357.01; 342/357.06; 342/357.09

(58) Field of Search .................................... 701/9, 21, 65, 701/66, 207, 213, 214, 301; 455/446, 456; 212/223; 340/425.5, 435, 436, 438, 474; 342/357.01, 357.02, 357.06, 357.09

(56) References Cited

U.S. PATENT DOCUMENTS

| | | | |
|---|---|---|---|
| Re. 35,498 | 4/1997 | Barnard . | |
| 4,835,537 | 5/1989 | Manion . | |
| 5,325,302 | 6/1994 | Izidon et al. . | |
| 5,343,739 * | 9/1994 | Curry | 212/280 |
| 5,467,282 | 11/1995 | Dennis . | |
| 5,506,587 | 4/1996 | Lans . | |
| 5,519,403 | 5/1996 | Bickley et al. . | |
| 5,627,546 | 5/1997 | Crow . | |
| 5,636,123 | 6/1997 | Rich et al. . | |
| 5,646,630 | 7/1997 | Sheynblat et al. . | |
| 5,646,844 | 7/1997 | Gudat et al. . | |
| 5,752,218 | 5/1998 | Harrison et al. . | |
| 5,777,580 | 7/1998 | Janky et al. . | |
| 5,798,726 | 8/1998 | Schuchman et al. . | |
| 5,805,200 | 9/1998 | Counselman, III . | |
| 5,839,080 | 11/1998 | Muller et al. . | |
| 5,892,439 * | 4/1999 | Molina | 340/471 |

OTHER PUBLICATIONS

Cooperative Collision Avoidance System, IBM Technical Disclosure Bulletin vol. 38 No. 02 pp. 1–2, Feb. 1995.

* cited by examiner

*Primary Examiner*—William A. Cuchlinski, Jr.
*Assistant Examiner*—Gertrude Arthur
(74) *Attorney, Agent, or Firm*—Jeffrey S. Labaw

(57) ABSTRACT

A method for optimizing the operation of a drawbridge is disclosed. The location of each a set of land vehicles approaching the drawbridge via a global positioning system calculation is determined. Each land vehicle, determining a cell corresponding to its determined location. Each land vehicle broadcasts a message at a time slice allocated for the cell. Similarly, a ship approaching the drawbridge determines its position via a global positioning system calculation, determines a cell corresponding to the location of the ship and broadcasts a message at a time slice allocated for the cell. The drawbridge controller receives broadcasted messages from the land vehicles and the ship. Using the received broadcasted messages, the drawbridge controller determines the optimal period to lift the drawbridge.

1 Claim, 6 Drawing Sheets

VEHICLE SCHEDULING AND COLLISION AVOIDANCE SYSTEM USING TIME MULTIPLEXED GLOBAL POSITIONING SYSTEM

BACKGROUND OF THE INVENTION

This invention relates generally to determining position by electromagnetic radiation. More particularly, the invention relates to an improved system for using sensed position data to control vehicle barriers.

As the world becomes a more crowded and busy place, there are an increasing number of other vehicles on the road, on the rail, on the sea and in the air. Very early in the development of our roadway system, the traffic light was developed to control the flow of traffic at intersections. The earliest traffic lights were simply controlled by timers, each light was on for an allotted period of time within a cycle which repeated over and over. Some level of sophistication was added when the traffic patterns at a particular intersection were studied at the timers, no computer controlled, varying the timing of the traffic lights according to the predicted average traffic load for different times of the day. Yet it was recognized that the average load was frequently not the actual load for a given moment in time. Sensors in the road were developed and coupled to the traffic light controller so that the timing of the traffic light could be at least somewhat sensitive to the actual road conditions.

In addition, the land based and seagoing vehicles while they predominantly stay on their own mediums of transport sometimes will intersect each other. One example of this interaction is at a drawbridge. Because of the expense associated in building bridges which are high enough to accommodate the tallest of ships, the drawbridge has become a fixture on many coastal waterways. When a ship beyond a certain height must pass, the drawbridge operator must raise the drawbridge. When this happens traffic across the bridge will stop. As this is typically a highly manual operation, the occupants of the ship or the vehicles wishing to cross the bridge are subjected to long delays.

The Applicants propose an improved method of controlling crossings where two modes of conveyance intersect such as a drawbridge using position sensing. The Global Positioning System (GPS) is currently the most precise positioning system generally available to the general public and has significantly dropped in price in recent years. More and more vehicles come equipped from the factory with GPS and this trend is expected to continue. The GPS comprises a network of 24 satellites orbiting the earth. Each satellite transmits a ranging signal modulated on a 1.575 Ghz carrier. By monitoring the signal from a plurality of satellites, a GPS receiver can determine its position, i.e. latitude, longitude and altitude, to an accuracy of about 15 meters. In general, this degree of accuracy would be attained if signals from three or four of the GPS satellites were received. More accurate GPS signals are available to the military. Differential GPS, also available to the public, is more accurate than standard GPS, but requires an additional land based transmitter and special permission from the government.

Many of the uses for GPS-based systems known to the Applicants are in the realm of mapping or collision avoidance applications. Notably one such GPS-based system is taught by "Traffic Alert and Collision Avoidance Coding System", U.S. Pat. No. 5,636,123 to Rich et al. In the Rich system, the airspace is divided up into a grid of volume elements. A collision avoidance signal is transmitted wherein the carrier signal is modulated by a psuedonoise code which is function of the volume element in which the aircraft is located. Each aircraft only tracks collision avoidance signals from vehicles in its own and immediate surrounding cells. Based on the calculated paths of the aircraft, a warning of an impending collision can be provided to the pilot.

The Applicants have proposed an improved tracking and collision avoidance system in "Time Multiplexed Global Positioning System Cell Location Beam System" Ser. No. 09/239,335, filed the same day as the present application, is commonly assigned and is hereby incorporated by reference. Although the invention described in the incorporated application does not address the problems of controlling traffic lights, it does share an overall cell structure with the preferred embodiment of the present invention.

This invention solves these and other important problems.

SUMMARY OF THE INVENTION

A method for optimizing the operation of a drawbridge is disclosed. The location of each a set of land vehicles approaching the drawbridge via a global positioning system calculation is determined. Each land vehicle, determining a cell corresponding to its determined location. Each land vehicle broadcasts a message at a time slice allocated for the cell. Similarly, a ship approaching the drawbridge determines its position via a global positioning system calculation, determines a cell corresponding to the location of the ship and broadcasts a message at a time slice allocated for the cell. The drawbridge controller receives broadcasted messages from the land vehicles and the ship. Using the received broadcasted messages, the drawbridge controller determines the optimal period to lift the drawbridge.

BRIEF DESCRIPTION OF THE DRAWINGS

The foregoing features, advantages and aspects of the invention will be better understood with reference to following detailed description which describes the accompanying drawings wherein.

DETAILED DESCRIPTION OF THE DRAWINGS

Figure 1:
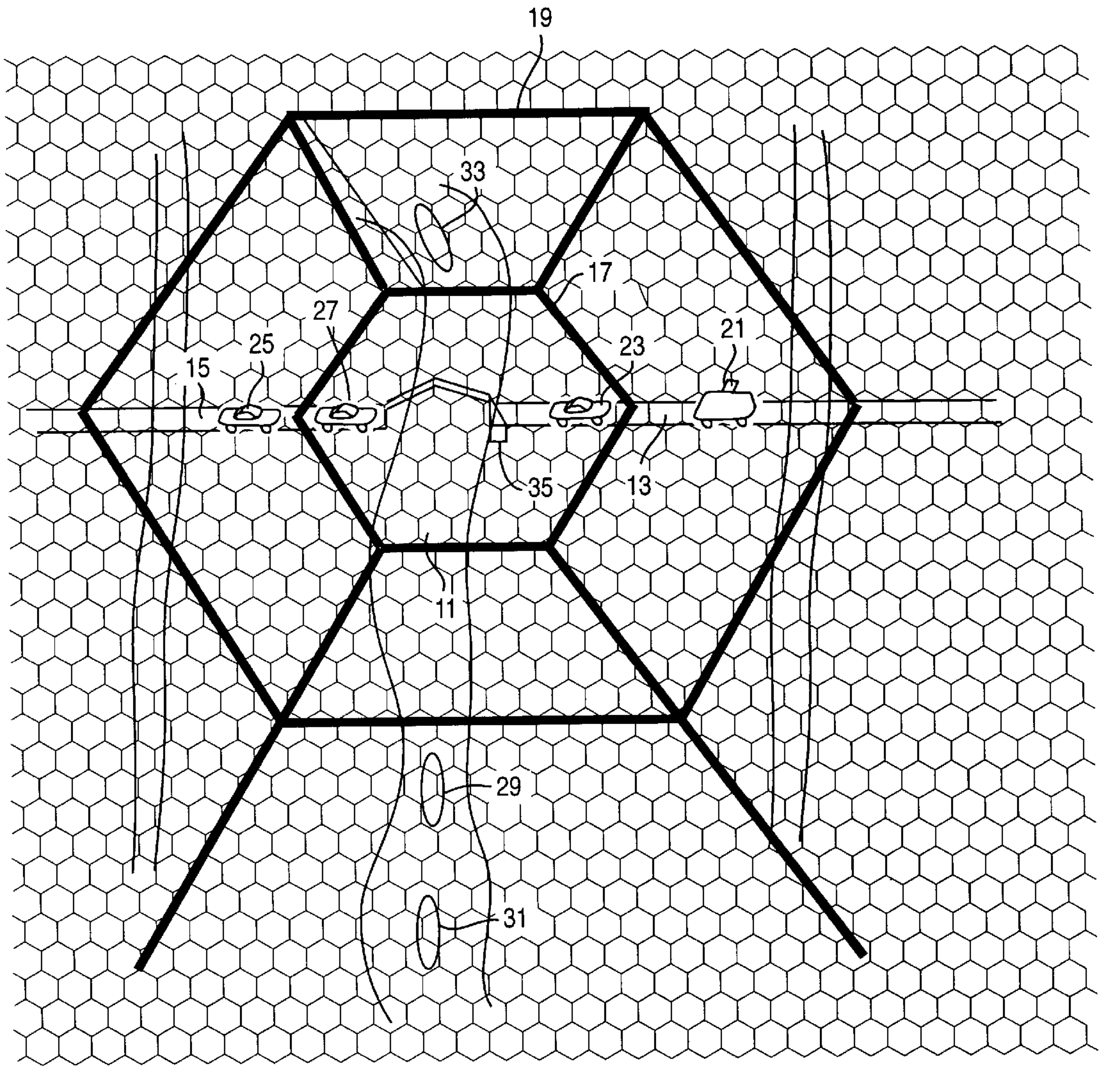
FIG. 1 is a pictorial view of a plurality of land vehicles and sea vehicles operating on a surface surrounding a drawbridge which has been partitioned into a hierarchy of two dimensional cells according to the present invention.

As mentioned above, many vehicles such as automobiles, aircraft and boats have GPS receivers. The Time Multiplexed GPS based Cell Location Beacon System (hereinafter "TCELL") proposed by this invention makes use of the GPS receiver for determining the location of a vehicle or other machine. The TCELL system also uses the GPS clock to avoid transmission collisions in time. The embodiment shown in FIG. 1 shows a coastal area divided into a hierarchically organized set of cells. For ease in illustration, the cells are shown as hexagons. However, the surface can be divided into any shape which can be tightly packed, i.e. there is no space which is not allocated to a cell. For ease of illustration, only a limited portion of the coastal area is shown. Potentially, the TCELL system aboard each machine would contain information relating to a large area, such as the surface of the earth.

The first level of the hierarchy is called a "minicell". As shown in FIG. 1, minicells 11, 13, 15, for example, having radius R1, are relatively small and measured in one to a few hundreds of feet. The aim in constructing the size of the minicell is to have a single machine in a minicell. If two machines are occupying the same minicell, they have effectively collided. As the machines move through space, they continually determine their position via GPS and determine which minicell they are in by reference to a minicell directory or formula.

The next level of the hierarchy is called a "group cell". A semispherical collection of minicells forms a group cell 17, having radius R2. The group cell diameter is approximately the range of the weak TCELL transmitter. The number of minicells within a respective group cell will depend therefore on the size of the minicell and the strength of the TCELL transmitter.

The highest level is called a "giant cell" 19. A group cell and all of its immediate neighbors forms a giant cell with a radius of 3*R2. In the diagram, the each giant cell is comprised of 7 group cells, although this can differ depending on the base shape used for the cells. Further, the base shape for the minicell can be different from that used for the group and giant cells. In many applications, the size of the giant cell is adjusted to the size of the entire map. Within each giant cell, each minicell is linearly enumerated and mapped onto a small time slice in an n second repeating unit of time exactly specified by the GPS clock. The small time slice is at least the amount of time that a signal would propagate across a giant cell. For a 20 mile giant cell this time would be slightly more than 100 microseconds. Thus, the minicell in which the vehicle finds itself in determines when the vehicle is allowed to transmit its location data. It is worthwhile to note that respective minicells within different giant cells will transmit at the same GPS time. However, because of attenuation, speed of light effects and/or frequency use respective TCELL receivers will not be confused or overwhelmed.

In the preferred embodiment, each vehicle, cars 21, 23, 25, 27, and ships 29, 31, 33 has a weak TCELL transmitter capable of transmitting a signal approximately with a range of 2*R2. For other purposes, e.g., collision avoidance, the vehicles within the immediate group cell can receive the signal. For the control of the drawbridge, the TCELL system can be reduced in cost by eliminating the TCELL receiver in the vehicles. Only the drawbridge computer 35 would be coupled to a TCELL receiver. Each TCELL transmitter sends a burst of data during the time slice and on the frequency determined by its location, i.e. which minicell it is in. The TCELL receiver can also be designed to filter out signals below a certain signal strength threshold to improve the discrimination of close and far vehicles. It is expected that vehicles in only a relatively local group of minicells must be monitored by a given drawbridge.

Referring to the figure, it will be noticed that the drawbridge itself is in a minicell. The drawbridge computer can be equipped with a TCELL transmitter. This can provide warning to oncoming vehicles that there is a drawbridge ahead. The TCELL transmitter at the drawbridge would transmit a message which would include its location, an ID, its current state (up or down) and its planned states for the next period of time. The message can be used to generate a message on the onboard computer of the oncoming vehicle. The message could indicate that there will be a drawbridge which will be up in a certain number of minutes. The message could also indicate that if the driver maintains a certain (legal) speed until he approaches the drawbridge, a wait at the bridge will be avoided.

As will be appreciated by the skilled practitioner, the size of the minicell is a factor of the vehicle characteristics such as size and speed as well as the number of minicells in giant cell. The size of the minicell is also strongly influenced by the propagation time for the TCELL signal across a giant cell and the number of channels used by TCELL system. Each minicell within a given giant cell is allotted a time slice of an overall repeating time period. The time slice must be large enough for each transmitter to transmit the required information and allow the signal to propagate the diameter of a giant cell. Where multiple frequencies are used, the time slices allocated to each frequency are independent of although comparable in duration to the time slices allocated for any other frequency. In the multiple frequency case, minicells within the same giant cell will use the same time slice on different frequencies. Therefore, there can not be too many minicells within a giant cell.

In other embodiments of the invention, further separation of signal by having vehicles within a given giant cells transmit at different frequencies is unnecessary. Where there are a relatively large number of minicells and a requirement that each machine signal at a relatively high rate, there will be a greater need to use more frequencies. Where there are fewer minicells and the vehicles do not need to transmit often, a single frequency can be used. Furthermore, although the specification of weak transmitters allows for an inexpensive system, a weak transmitter, i.e. one which can transmit only across a group cell, is not a necessary feature of the invention. With stronger transmitters, vehicles within one giant cell can transmit at a different frequency than those within a second giant cell. As the vehicle goes from giant cell to giant cell, the TCELL transmitter and possibly receiver as well will automatically switch to respectively transmitting and listening at the appropriate frequencies.

In some embodiments, the respective receivers within a TCELL system may have different sensitivities. That is, TCELL receivers for the drawbridge computers could be more sensitive than those in the vehicles or vice versa.

For an automobile transmitting at a frequency of 300 MHz an appropriate minicell size is 30 feet in diameter. The group cell size is 330 feet diameter and the giant cell size is 1000 feet in diameter. This translates into about 9000 minicells being in a giant cell. Figuring a periodicity of 30 seconds between transmissions for a particular automobile, this allows 30 milliseconds for each TCELL transmitter to send a 150 bit message on a 10 kHz bandwidth. Within its allotted time slot, each vehicle can transmit its vehicle ID, vehicle type, location, direction of travel and speed, and the frequency to which its audio receiver is tuned. Any other TCELL receiver in the listening area can thus determine the location of the vehicle.

The drawbridge computer 35 will monitor the distribution of oncoming vehicles and calculate the optimal time for raising the drawbridge. The optimal time is a function of the position, number and speed of the detected vehicles. The height of the ship will also determine how high and how long the drawbridge must be open. Preferably, the drawbridge should be raised during a period of a traffic lull and for as short a period as possible. The aim is to require as few vehicles to actually stop. If it is necessary, the vehicles should be stopped for a minimum amount of time.

The reader will note that the invention may be described in terms of listening, selecting, comparing, determining or other terms that could be associated with a human operator. The reader should remember that the operations which form the invention are machine operations processing electrical signals to generate other electrical signals.

Figure 2:
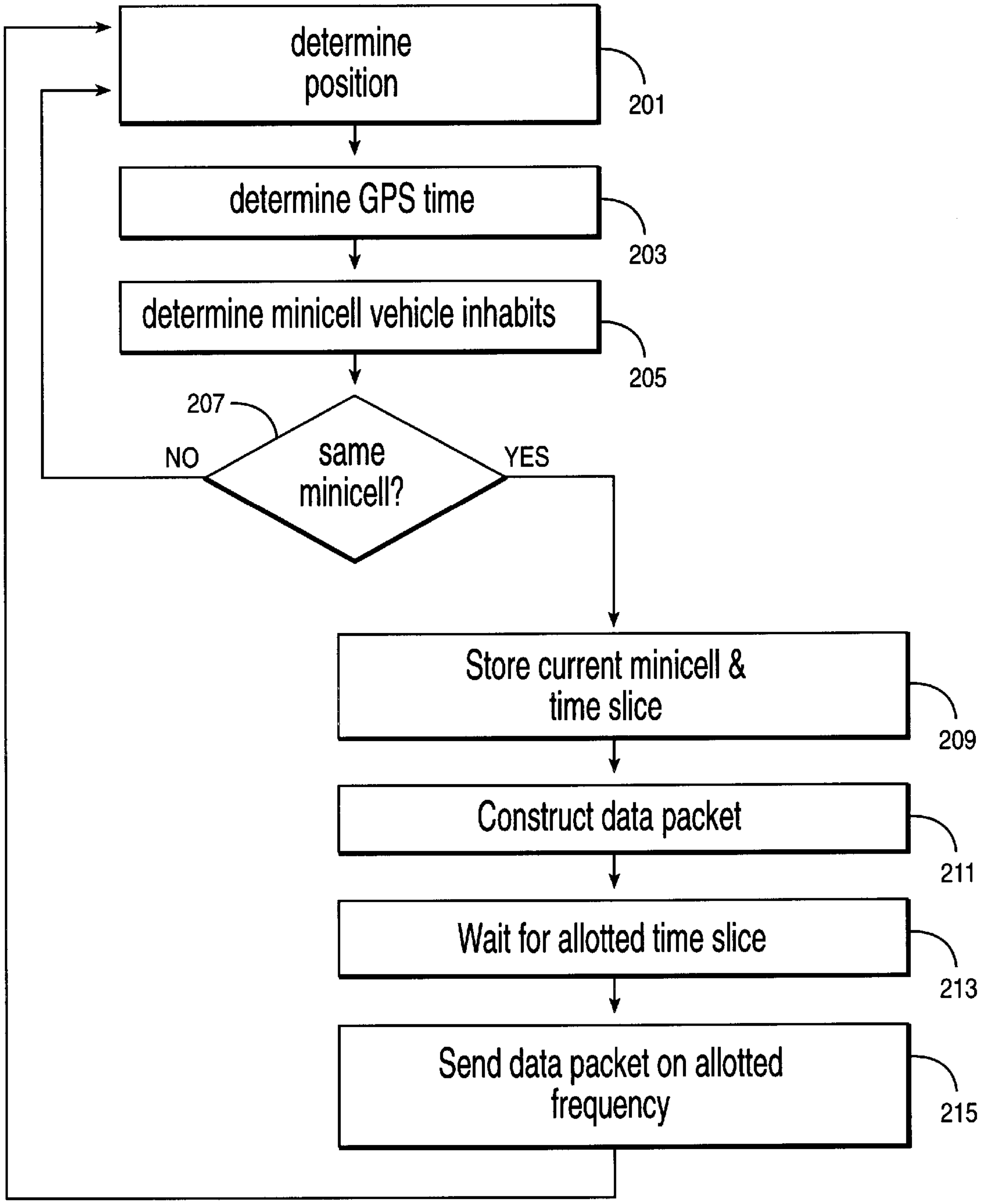
FIG. 2 is a flow diagram for transmitting the location of a vehicle according to the present invention.

In FIG. 2, a flow diagram of the transmission procedure for a TCELL transmitter located at a respective vehicle is shown. The transmission procedures at each machine are similar; they will typically vary according to cell size, time slice and assigned frequency, but are otherwise similar. In step 201, the TCELL system in the vehicle determines its position, e.g., latitude and longitude using a GPS receiver. If a differential GPS system is used, a high accuracy in position is usually attained.

At step 203, the TCELL system determines the GPS time as defined by the signal received from the GPS satellites. At step 205, the TCELL system determines which minicell it is in by reference to the minicell directory or minicell formula and its calculated position. Preferably, the minicell directory and formula are an integral parts of the TCELL system. However, in the event of changes to the minicell system or in an area for which the TCELL system does not have a directory, it can be downloaded from a central authority. Generally, this would occur over a wireless transmission medium. Also, from the minicell directory or formula, the TCELL system would determine the time slice and frequency in which it was allowed to transmit. For reasons of minimizing memory requirements, the use of a minicell formula is preferred.

In step 207, a test is performed to determine whether the calculated minicell varies from the last calculated minicell by a predetermined amount. In general, the machine should be in the same or a proximate minicell from the last reading. If the minicell varies by more than the predetermined amount, the process cycles back to confirm the reading. In step 209, the current minicell and time slice are stored.

In step 211, a TCELL message is constructed. The message comprises data such as vehicle ID and type, XYZ position, heading, speed, frequency that the audio receiver of the vehicle is tuned and a check sum for error correction. At step 213, the TCELL transmitter waits until its allotted time slice occurs. At step 215, the TCELL message is sent during the allotted time slice for the minicell. The process returns to step 201 where the vehicle's position is updated according to the signals received by the GPS receiver.

Figure 3:
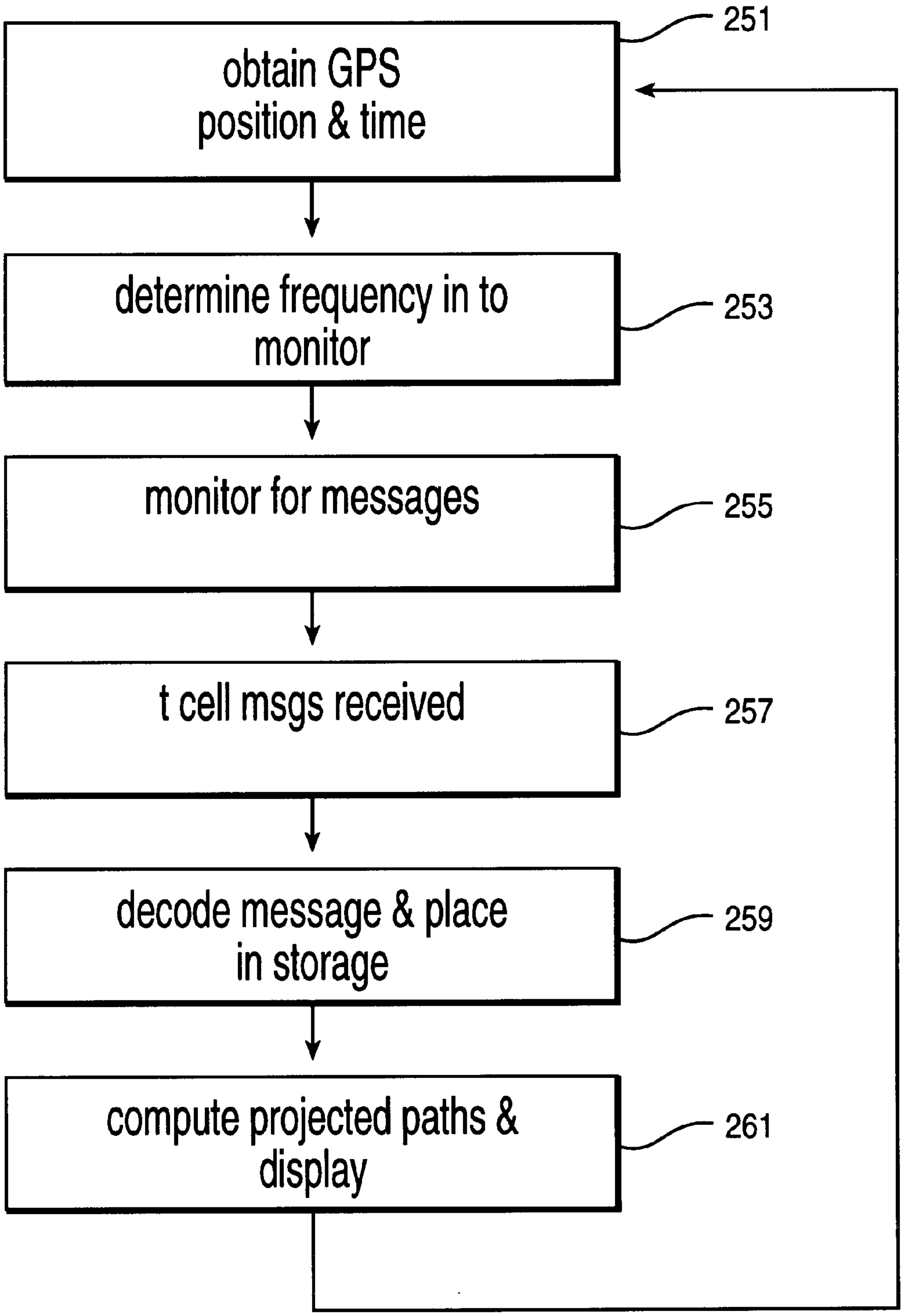
FIG. 3 is a flow diagram for receiving the transmitted location messages from a plurality of vehicles operating within the hierarchically divided space.

FIG. 3 is a flow diagram for receiving the transmitted location messages from a plurality of vehicles operating within the hierarchically divided space. Each vehicle can not only contain the TCELL transmitter, but also a TCELL receiver. For drawbridge control, only the TCELL receivers at the drawbridge computers need be used in the overall system. A monitoring step 255 is entered. It monitors for TCELL messages across the entire time period for the giant cell in which the TCELL receiver is located for a given number of periods. Next, in step 257, a TCELL message is received. In step 259, the message is decoded and the data therein is placed in the vehicle tracking database, including the vehicle ID, vehicle type, position, bearing and speed. Although not shown, error checking using the check sum or checking the time slice in which the TCELL message was received against the information in the message can be performed at this time.

The information in the vehicle tracking database is used to generate an optimal drawbridge timing pattern, step 261. After a predetermined number of time periods has elapsed, the process returns to step 255 to monitor and calculate the vehicles' positions.

Figure 4:
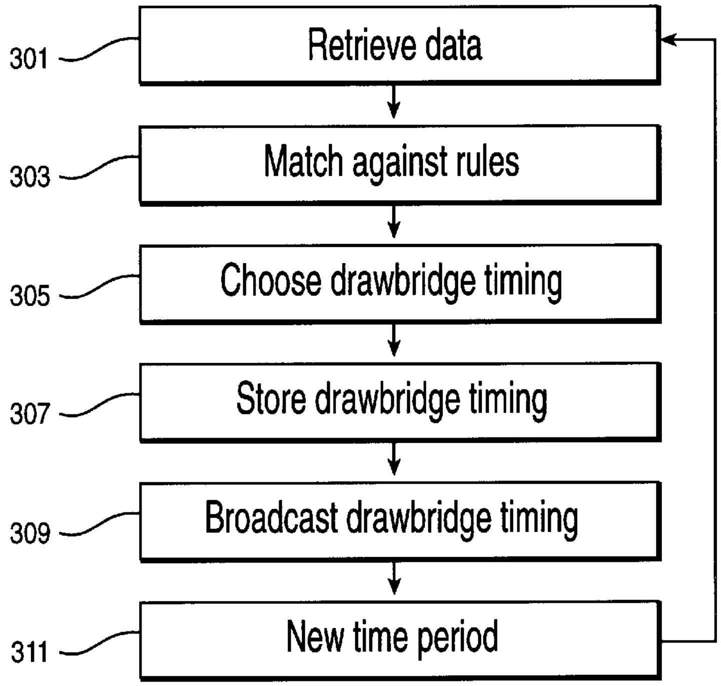
FIG. 4 is a flow diagram for controlling a drawbridge according to the detected locations of oncoming vehicles.

FIG. 4 is a flow diagram for control of the drawbridge using a TCELL system. In step 301, the data from the tracking database is retrieved. The location of the detected vehicles is matched against a set of rules in step 303. The rules use the vehicles' position, speed and number as inputs. Also, used are the dimensions of the ship which will pass underneath, i.e. the height and length of the ship. These parameters can be passed in the TCELL message sent by the ship.

Based on the oncoming traffic distribution, step 305, the timing of raising the drawbridge is chosen. In step 307, the planned time to raise the drawbridge is stored. In step 309, the bridge raising time is broadcast. If a TCELL message is used, the process is similar to that described above, but since the drawbridge is fixed at a given location, repeated calculation of which minicell it is in is unnecessary. The TCELL message is sent during the time slot allotted for the minicell in which the drawbridge is located. Alternatively, the vehicles could be contacted by an audio prompt over the radio channel to which the vehicle is listening. The process will return to step 301 once a new time period has begun, step 311.

Figure 5:
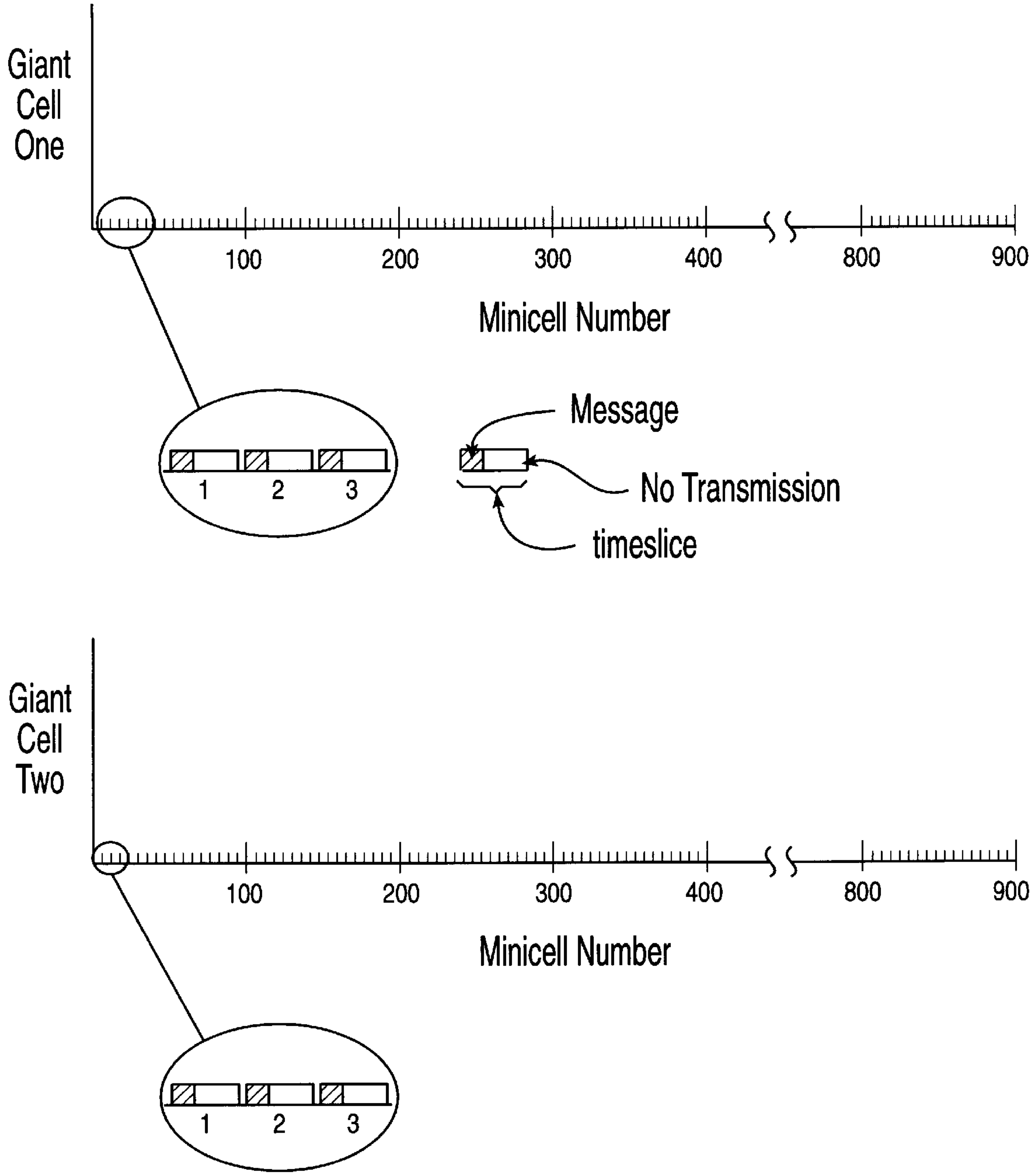
FIG. 5 is a diagram showing the allotted time slices for respective minicells within a two dimensional hierarchy.

FIG. 5 shows the allotted time slices for two adjacent giant cells. Each giant cell contains 900 minicells which for the sake of illustration are allotted time slices in numeric order on a single frequency. However, as those skilled in the art would recognize other orders and addition frequencies are possible. The reader can imagine that each giant cell contains nine group cells arranged in a two dimensional plane each of which contains 100 minicells. Within each giant cell, the group cell to the northwest contains minicells 1–100 numbered left to right, the group cell due north contains minicells 101–200, the group cell to the northeast contains minicells 201–300 and so forth. Minicell 1 in giant cell 1 has the same time slice as minicell 1 in giant cell 2 and so forth.

Although not illustrated, the transmitters in each group cell could use one of nine different frequencies so that the interval between each time slice allotted to a minicell can be reduced. In this case, within each giant cell, minicells 1, 101, 201, 301, 401, 501, 601, 701, 801 and 901 would transmit during the same time slice albeit at different frequencies.

Figure 6:
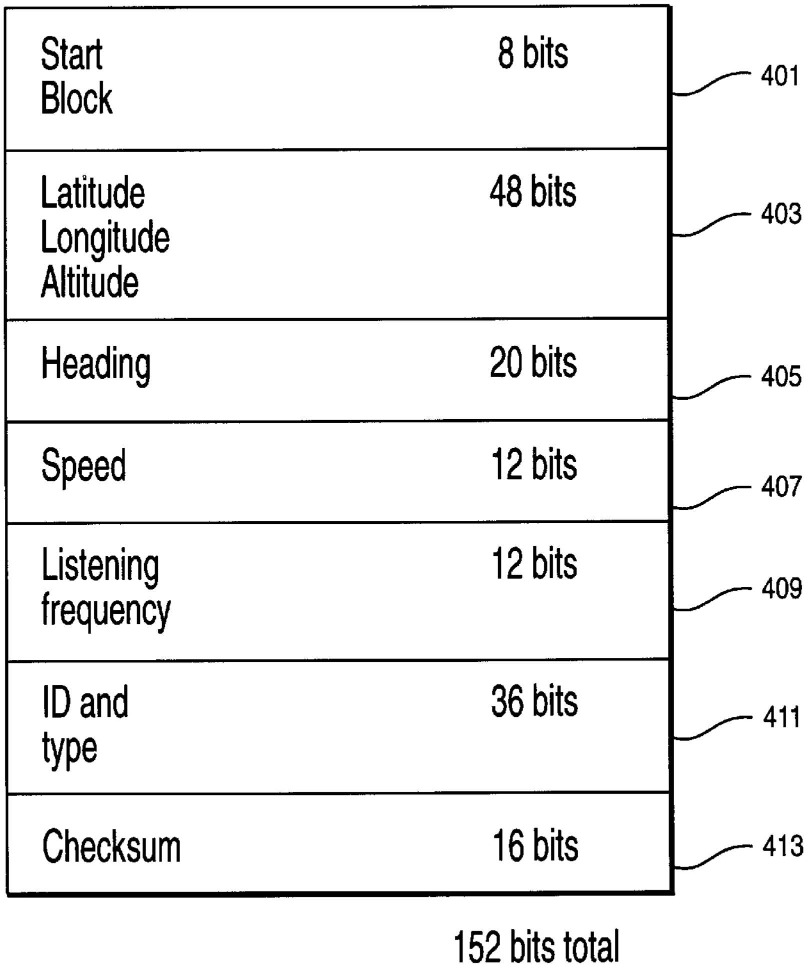
FIG. 6 shows a sample message for one embodiment of the invention.

FIG. 6 shows a sample message for the vehicle embodiment of the invention. In this example, the message is 152 bits long. With a transmission of 9600 baud, the message takes approximately 16 milliseconds to transmit. The TCELL system requires some time to transition from the listening to transmitting mode so a start block 401 of eight bits is included. The next 48 bits 403 includes position information. The next 20 bits 405 includes the heading data. One skilled in the art would readily appreciate the position and heading information can be expressed in a variety of different ways. The next 8 bits 407 includes the speed data. Next, 12 bits 409 are used additional data such as radio frequency data representing the audio frequency at which the vehicle can be contacted. The next 40 bits 411 are used for transmission of additional data such as the vehicle ID and vehicle type as may be required. The vehicle ID or type can be used to determine the height and length of the ship by cross-reference to a database containing this information. Alternatively, these bits could be used to explicitly include the height and length information. The checksum used for error checking is stored in the last 16 bits 413.

The time slice has to be longer than the time that it takes for the signal to propagate across the giant cell. For a twenty mile wide giant cell, this translates to 100 microseconds.

One skilled in the art would appreciate that the message format could vary according to the needs of the particular implementation of the TCELL system. For example, the message can be shortened to include only a start block and the vehicle ID. The time slice itself represents a particular minicell so the time at which the message is received can be used to determine the machine's position with 30–100 meters. The machines' heading and speed can be calculated from successive messages. If the dimensions of the boat are obtained from the vehicle ID, the vehicle type may not be needed. The refinement of using TCELL to transmit the dimensions of the ship passing underneath the bridge is not strictly necessary. A default bridge raising time can be used which would allow any ship capable of traveling the waterway to pass could be used. The drawbridge could be equipped with sensors to make sure that the ship will pass successfully under the bridge type. The audio frequency is unnecessary for the cars as part of the drawbridge application of the TCELL system, this data does not necessarily need to be transmitted. Finally, error checking using the check sum is not strictly necessary. Shortening the message allows the potential of shortening the time slice and thus increasing the periodicity at which each machine can broadcast its position.

Figure 7:
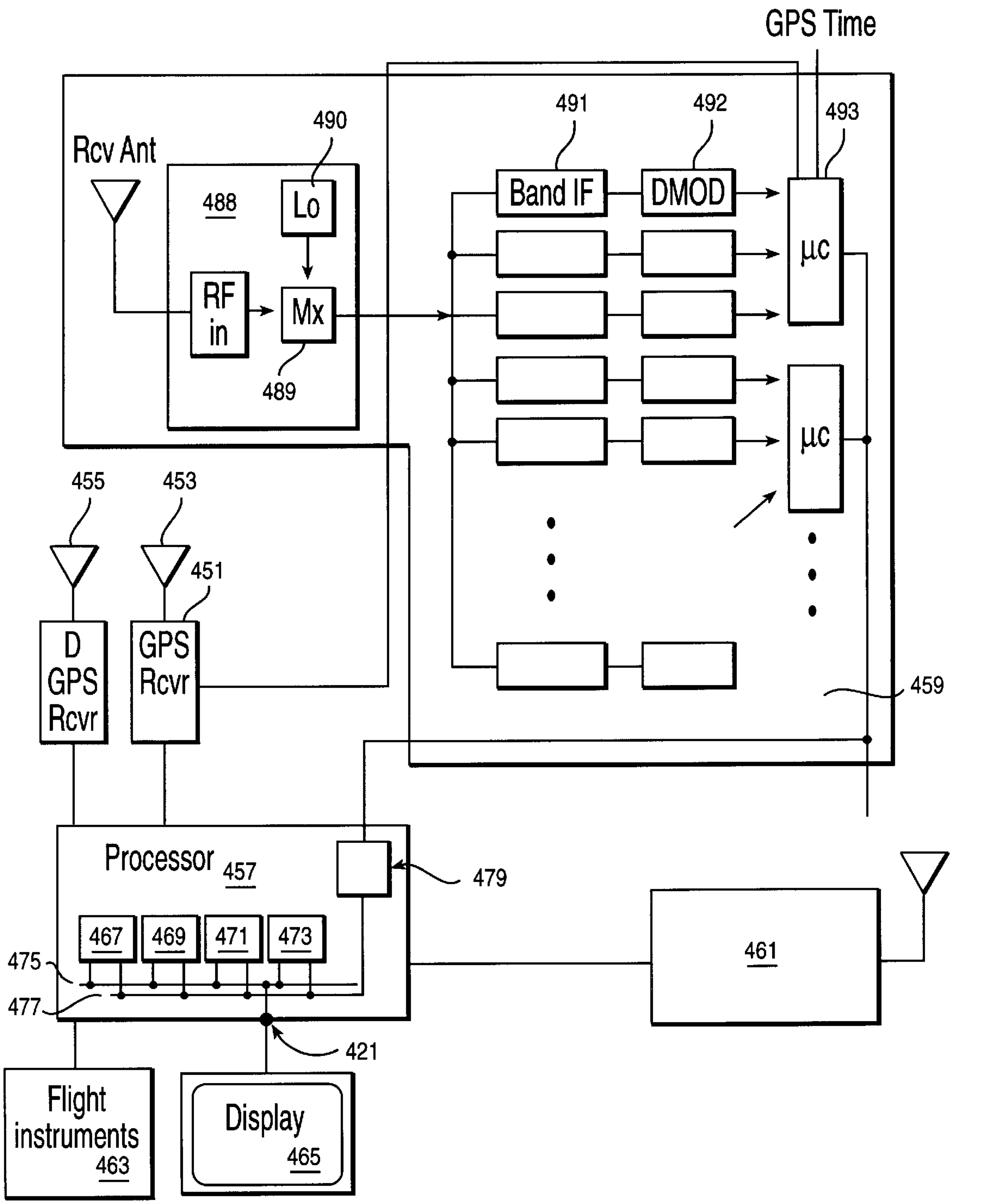
FIG. 7 is a block diagram of the TCELL system suitable for a vehicle.
Figure 7:
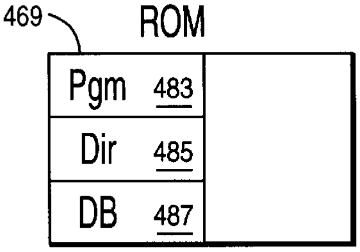

FIG. 7 is a block diagram of the TCELL system suitable for a vehicle. As mentioned above, the TCELL systems at the vehicle can be simplified by omitting the TCELL receiver, those at the drawbridge may omit the transmitter. However, both are shown in the integrated system depicted in the figure. As shown in the figure, a GPS receiver 451 includes GPS antenna 453 and possibly a differential GPS antenna 455 is coupled to the TCELL processor 457. As mentioned above, the GPS receiver 451 may have other inputs from a barometric altimeter (not shown). The GPS receiver 451 and TCELL processor 457 communicate position and time information. The TCELL processor 457 is in turn coupled to the TCELL receiver 459 and TCELL transmitter 461. The TCELL processor 457 is also coupled to the controls 463 which provide heading and velocity information. Optionally, this information can be established from calculations using the GPS position and time data. The TCELL processor 457 is also coupled to a display 465 which presents a user interface to the operator of the vehicle.

The TCELL processor 457 comprises a microprocessor 467, a RAM 469, a program memory 471 and a timer circuit 473 all coupled to and communicating via a data bus 475 and an address bus 477. Communication with the TCELL receiver 459 and TCELL transmitter 461 is accomplished by means of a serial I/O interface 479. Control of the display 465 is performed by a video adapter 481. The timer circuit 473 which keeps track of the time slots is fed the time data from the GPS receiver 451.

The RAM 469 contains the TCELL program 483, cell directory and/or formula 485 and the vehicle tracking database 487. The TCELL program 483 receives the data from the GPS receiver, TCELL receiver and other inputs, analyzes the data, constructs a TCELL message and instructs the TCELL transmitter when to send the TCELL message. In a multiple frequency embodiment, the TCELL receiver has a front end 488 with a mixer 489 and a local oscillator 490 which picks up a band of frequencies, e.g., a 50 kHz bandwidth. Assuming that there are 5 channels, each channel has a tuner, a bandwidth IF 491, which is tuned to a respective 10 kHz band. This is coupled to a demodulator 492 which is in turn coupled to a microcontroller 493. Each microcontroller 493 processes the TCELL signals received on the channel for use by the TCELL processor 457.

As described above, the preferred embodiments of the invention are a system programmed to execute the method or methods described herein, the methods themselves and a computer program product. The sets of instructions which comprise the computer program product are resident in a random access memory of one or more systems as described generally above during execution. Until execution, the sets of instructions can be stored in another type of memory such as flash memory, hard disk or CD-ROM memory. Furthermore, the sets of instructions can be stored in the memory of another computer and transmitted to the system when desired by a wired or wireless network transmission medium. The physical storage or transmission of the sets of instructions change the medium in which they are resident. The change may be electrical, magnetic, chemical or some other physical change.

While the present invention, its features and advantages have been described with reference to certain illustrative embodiments, those skilled in the art would understand that various modifications, substitutions and alterations can be made without departing from the scope and spirit of the invention. Therefore, the invention should be not construed as being narrower than the appended claims.

We claim:

1. A method for optimizing the operation of a drawbridge, comprising the steps of:

determining a location of each a set of land vehicles approaching the drawbridge via a global positioning system calculation;

at each land vehicle, determining a cell corresponding to the determined location;

at each land vehicle, broadcasting a message at a time slice allocated for the cell;

determining a location of a ship approaching the drawbridge via a global positioning system calculation, determining a cell corresponding to the location of the ship and broadcasting a message at a time slice allocated for the cell;

receiving broadcasted messages from the land vehicles and the ship; and using the received broadcasted messages to determine an optimal period to lift the drawbridge.

* * * * *